United States Patent [19]

Stookey

[11] 3,926,927

[45] Dec. 16, 1975

[54] STRIPPING MONOMERS FROM A SLURRY OF COPOLYMERIZED ACRYLONITRILE

[75] Inventor: Donald J. Stookey, Decatur, Ala.

[73] Assignee: Monsanto Company, St. Louis, Mo.

[22] Filed: Nov. 25, 1974

[21] Appl. No.: 526,665

[52] U.S. Cl. .......... 260/85.5 S; 159/48 R; 159/165; 203/DIG. 3; 203/96
[51] Int. Cl.$^2$........................................ C08F 124/00
[58] Field of Search.......... 159/46 C, 48 L, 165, 45; 23/267 C, 271 P; 203/95, 96, DIG. 3; 260/85.5 R, 85.5 S, 88.7 R, 88.7 B

[56] References Cited
UNITED STATES PATENTS

| | | | |
|---|---|---|---|
| 2,681,306 | 6/1954 | Kemp et al. | 203/96 |
| 3,074,786 | 1/1963 | Duthie | 23/267 C |
| 3,151,046 | 9/1964 | Larson | 203/96 |
| 3,454,542 | 7/1969 | Cheape | 260/88.7 B |

*Primary Examiner*—Norman Yudkoff
*Assistant Examiner*—Hiram H. Bernstein
*Attorney, Agent, or Firm*—Robert L. Broad, Jr.

[57] ABSTRACT

The method of stripping unreacted monomers from slurries produced by polymerization of acrylonitrile with other mono-olefinic monomers wherein the slurry is fed downward through a treatment zone having a sequence of surfaces each having therein perforations through which the slurry can flow downward onto the next surface in the sequence. Steam is fed upward through the perforations and the slurry on the surfaces to strip unreacted monomers from the slurry and to agitate the slurry to prevent settling of polymer solids. The steam feed is reduced or stopped intermittently to allow the slurry to flow through the perforations under the influence of gravity.

4 Claims, 1 Drawing Figure

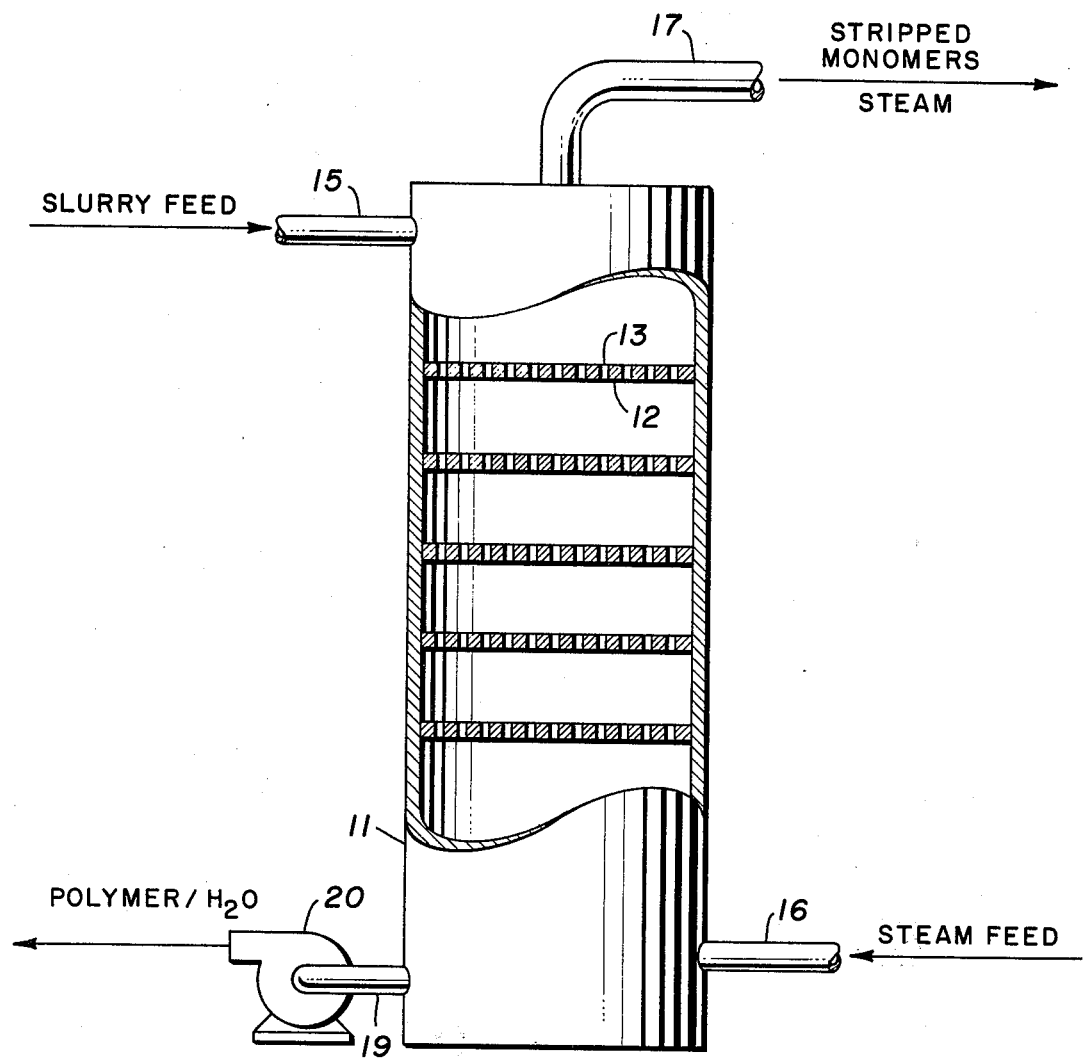

STRIPPING MONOMERS FROM A SLURRY OF COPOLYMERIZED ACRYLONITRILE

BACKGROUND OF THE INVENTION

1. Field of the Invention

This invention relates to methods for stripping unreacted monomers from polymer slurries.

2. Description of the Prior Art

Acrylic polymers are conventionally manufactured by suspension polymerization process, with the polymer solids subsequently being removed from the polymerization slurry by a filtration process and then washed. Excess unreacted and volatile monomers are then recovered by distillation from the solids-free filtrate and polymer wash liquors in a distillation column. However, the high volatility of some monomers results in yield losses and safety hazards in handling the polymer slurry when equipment such as rotary vacuum filters is used. Attempts have been made to strip the unreacted monomers directly from the polymerization slurry but pluggage of equipment and handling of the slurry have been major problems.

Removal of unreacted monomers from acrylonitrile polymerization slurries has also been attempted by injecting the slurry into a high velocity stream of steam and then passing the mixture through a heat exchanger or phase contactor designed to maintain a high turbulence in the mixtures, as in U.S. Pat. No. 3,469,617. Even this process is subject to the problem of fouling and plugging of the heat exchanger.

Another prior art method of removing unreacted monomers from polymerization slurries is disclosed in U.S. Pat. No. 3,454,542, where the slurry is allowed to cascade down a baffle-type stripping column while steam is fed upward through the column countercurrent to the cascading slurry. Pluggage and fouling are reduced in this process but contact between the slurry and the steam is not as good as desired, resulting in lessened monomer stripping.

SUMMARY OF THE INVENTION

In the process of the present invention a slurry produced by the polymerization of acrylonitrile with other mono-olefinic monomers is passed downward through a treatment zone having a sequence of surfaces each having therein perforations through which the slurry fed to the uppermost surface of the treatment zone can flow downward, from surface to surface, onto the lower surfaces in the sequence. Steam is forced upward through the slurry in the treatment zone in countercurrent flow to the slurry. The steam flow is pulsed in that the steam feed is reduced or stopped intermittently. Steam is fed for a period of 5 to 15 seconds at a sufficiently high rate that substantially none of the slurry can flow downward through the perforations countercurrent to the steam flowing upward through the perforations. The steam feed is then reduced or stopped for a period of 1 to 10 seconds to allow the slurry to flow through the perforations by gravity head. The slurry feed may be continuous or cycled in phase with the reduced steam feed period. If the polymerization process is a bulk process the slurry entering the treatment zone will contain 30 to 50 weight percent of polymer solids, while a slurry produced by an aqueous polymerization will contain 8 to 25 weight percent of polymer solids.

DESCRIPTION OF THE DRAWING

The single FIGURE shows apparatus for carrying out the process of the present invention.

DESCRIPTION OF THE PREFERRED EMBODIMENTS

Referring now in detail to the drawing, there is shown a conventional column 11 having spaced trays 12, the trays 12 having apertures 13 through which the material to be treated can pass. The polymer slurry to be treated is fed into the column through line 15, while steam is fed into the bottom of the column through line 16. Steam containing the stripped monomers is carried off overhead through line 17 and the polymer/water mixture remaining after stripping is withdrawn from the column 11 through line 19 by a pump 20.

The slurry to be treated by the process of this invention is that slurry produced by the polymerization of acrylonitrile with other mono-olefinic monomers. Such a polymerization process is well known. Typically, the slurry coming from the polymerization reactor will be made up of polymer solids and unreacted monomers. If the polymerization process is an aqueous process the slurry will also contain water. The process of this invention is applicable to both bulk processes where there is no water in the slurry and aqueous processes where the slurry contains water. Any mono-olefinic monomers which are used in a significant proportions will have a volatility such that they will be stripped from the slurry along with any unreacted acrylonitrile monomers.

The polymerization slurry fed into the tray column 11 through the line 15 passes downward through the column 11 by passing through the apertures 13 in the trays 12. Steam fed into the column 11 through the inlet line 16 passes upward through the apertures 13 and the slurry on the trays 12 and is taken off through the line 17 with the stripped monomers. If desired, the slurry and the steam may be fed into the column alternately with each being fed for a predetermined time interval.

Steam is fed to the column for a time interval of 5 to 15 seconds and then the feed rate is discontinued or reduced for a period of 1 to 10 seconds. During the latter interval the slurry moves downward through the column by passing downward through the apertures 13. During the steam feed interval, the steam passing upward through the slurry stops the downward flow of the slurry. The steam passing through the slurry agitates the slurry to prevent settling of polymer colids and at the same time strips unreacted monomers from the slurry.

EXAMPLE I

A column 244 cm high and 7.6 cm square was used to carry out this run, which was made solely for the purpose of determining whether polymer solids would foul or plug the apparatus. The column had trays positioned at 60, 96.5, 127 and 179 cm from the bottom of the column, each tray having nine holes 12.7 mm in diameter. The column was mounted vertically with its bottom submerged about 38 cm below the surface of a slurry in an open top container. A circulation pump was used to feed the slurry to the top of the column.

The slurry used in this example was prepared by mixing an acrylic polymer with water to give a solids concentration of about 15 weight percent. The mixture in the container was agitated to prevent the polymer from settling out of the water. The particle size of the polymer was such that less than 10 weight percent was smaller than 40 microns, and 90 weight percent was smaller than 80 microns.

Air was fed into the column 15 cm below the bottom tray at a rate of 14 cfm. The slurry and air feeds were adjusted so that air flowed upward through the column for 10 seconds and was discontinued for the next 2 seconds in an alternating sequence. When the air flow ceased, the slurry flowed downward through the apertures 13 due to the gravity head. Slurry was fed continuously into the top of the column at a rate of 45.4 kg (100 pounds) per hour. The slurry loading was such that about 10 cm of froth showed on the trays.

The unit was operated continuously for 48 hours in the manner described above and no accumulation of solids was found on the trays when the trays were inspected after shutdown.

EXAMPLE II

A polymerization slurry was treated in a conventional column having eight trays. The aqueous slurry contained about 13 weight percent polymer solids, about 3.7 weight percent of unreacted acrylonitrile monomers and about 1.5 weight percent of other mono-olefinic monoolefinic monomers. The polymer had a particle size distribution essentially the same as described in Example I.

The polymerization slurry was fed into the top of the column at a rate of 367 kg (809 pounds) per hour. The slurry feed was from a polymerization reactor having a level control. Operation of the level control cause some pulsation in the slurry feed to the column, but this feed was more or less constant. Steam was fed into the bottom of the column at a rate, during the interval of steam feed, of 2.54 kg (5.6 pounds) per minute. Steam was fed for intervals of 5 seconds alternated with periods of 7 seconds when steam flow was ceased and slurry was allowed to flow down through the column. Turbulence created in the slurry on the trays was sufficient to prevent settling and accumulation of solids which might promote formation of scale or pluggage, so that there was no pluggage or fouling of the equipment.

Monomer concentration in the slurry taken off the bottom of the column was less than 300 parts per million. Since monomer concentration in the treated slurry should be as low as possible, it is preferred that the steam and slurry feed rates be such that the treated slurry contains less than 1,000 parts per million of unreacted monomers.

What is claimed is:

1. The method of stripping unreacted monomers from a slurry containing about 8 to 50 weight percent solids of a polymer composed of at least 35 weight percent acrylonitrile copolymerized with up to 65 percent of one or more other mono-olefinic monomers copolymerizable with acrylonitrile and up to about 70 weight percent unreacted monomers, based on slurry weight,
   a. feeding the slurry downward through a treatment zone having a sequence of surfaces each having therein perforations through which the slurry can flow downward onto the next surface in the sequence,
   b. forcing steam upward through the perforations in countercurrent flow to the slurry to strip unreacted monomers from said slurry, and
   c. repeatedly cycling the steam flow rate back and forth from a first flow rate to a second flow rate, said first flow rate being such that the slurry will not flow downward through the perforations while the steam is flowing at said first flow rate, said second flow rate being such that the slurry flows downward through the perforations in the surfaces during the time period of said second flow rate, said first flow rate being carried out for a first time period of 5 to 15 seconds, said second flow rate being carried out for a second time period of 1 to 10 seconds.

2. The method of claim 1 wherein the slurry feed to the treatment zone is stopped during said first time period.

3. The method of claim 1 wherein the treatment is carried out to the point that slurry leaving the treatment zone contains less than 1,000 parts per million of unreacted monomers.

4. The method of claim 1 wherein the slurry fed to the treatment zone is an aqueous slurry containing 8 to 25 weight percent polymer solids, and 1 to 10 weight percent unreacted monomers.

* * * * *